US009997142B2

(12) United States Patent
Roadman

(10) Patent No.: US 9,997,142 B2
(45) Date of Patent: Jun. 12, 2018

(54) GUITAR SADDLE ADJUSTMENT TOOL

(71) Applicant: James Roadman, San Antonio, TX (US)

(72) Inventor: James Roadman, San Antonio, TX (US)

( * ) Notice: Subject to any disclaimer, the term of this patent is extended or adjusted under 35 U.S.C. 154(b) by 0 days. days.

(21) Appl. No.: 15/463,146

(22) Filed: Mar. 20, 2017

(65) Prior Publication Data

US 2017/0278488 A1 Sep. 28, 2017

Related U.S. Application Data

(60) Provisional application No. 62/313,393, filed on Mar. 25, 2016.

(51) Int. Cl.

| | |
|---|---|
| ***G01D 1/00*** | (2006.01) |
| ***B24B 41/06*** | (2012.01) |
| ***B24B 49/00*** | (2012.01) |
| ***G10D 3/12*** | (2006.01) |
| ***G10D 1/00*** | (2006.01) |

(52) U.S. Cl.

CPC ............. *G10D 1/005* (2013.01); *B24B 41/06* (2013.01); *B24B 49/00* (2013.01); *G10D 3/12* (2013.01)

(58) Field of Classification Search

CPC ........ B24B 41/06; B24B 49/00; G10D 1/005; G10D 3/12

See application file for complete search history.

(56) References Cited

U.S. PATENT DOCUMENTS

| | | | | |
|---|---|---|---|---|
| 4,986,152 | A * | 1/1991 | Sammons | B23D 55/046 144/134.1 |
| 5,715,878 | A * | 2/1998 | Ondish | B25B 5/14 144/134.1 |
| 6,378,580 | B1 * | 4/2002 | Lovett | B23Q 1/5468 144/134.1 |
| 9,796,065 | B2 * | 10/2017 | Urban | B24B 41/06 |
| 2005/0005999 | A1 * | 1/2005 | White | B23Q 1/52 144/134.1 |
| 2017/0157737 | A1 * | 6/2017 | Urban | B24B 41/06 |

FOREIGN PATENT DOCUMENTS

WO 2005/102602 11/2005

OTHER PUBLICATIONS

"Nut and Saddle Sander," downloaded from www.stewmac.com about Mar. 2016.

"Saddle Master," downloaded from www.ebay.com about Mar. 14, 2017.

* cited by examiner

*Primary Examiner* — Marc Carlson

(74) *Attorney, Agent, or Firm* — Norton Rose Fulbright US LLP

(57) ABSTRACT

Certain embodiments of the present invention are directed to a device for shaping and/or adjusting the shape and/or height of a guitar saddle. The present invention allows for the radius and/or height of the guitar saddle to be shaped and adjusted accurately using dial indicators coupled to mechanical positioning apparatus that provide for positioning of a saddle or saddle material for removal of a prescribed amount of material from the top of the guitar saddle while maintaining the radius.

12 Claims, 4 Drawing Sheets

GUITAR SADDLE ADJUSTMENT TOOL

PRIORITY

This application claims priority to U.S. application No. 62/313,393 filed Mar. 25, 2016, which is incorporated herein by reference in its entirety.

BACKGROUND

The present invention relates generally to a guitar saddle (“saddle”) shaping tool. In particular, the present invention relies on a platform allowing the controlled movement of the guitar saddle in relation to a shaping tool to accurately shape the guitar saddle.

The guitar saddle is a piece of material, usually bone, plastic, or other hard material, in the bridge of a guitar that has a flat bottom and radius on top to match the radius of the guitar’s fretboard. To achieve this radius, the traditional method was to file or manipulate the part by hand against an abrasive surface. The height is then adjusted by continuing to adjust the radius lower, or by removing material from the bottom of the piece and retaining a flat bottom surface. Adjusting the height and radius in this manner is time consuming and requires that the instrument be restrung at intervals to check the progress as lowering the guitar saddle too much causes the instrument’s strings to contact the frets during play. The ability to achieve a consistent radius is dependent on the skill of the luthier, a maker of stringed instruments such as violins or guitars. It is common that once the radius is achieved, further material is removed from the bottom of the saddle to avoid the more difficult task of making a radius. There are, however, several reasons to avoid removing material from the bottom of the guitar saddle. The instrument bridge and the guitar saddle may have developed an arch and flattening the bottom of the guitar saddle would result in a less perfect fit. In some cases, the guitar saddle is mated to a piezo pickup underneath and once the string volume balance is achieved altering the bottom could upset the pairing with the pickup. There remains a need for additional devices to shape a guitar saddle while maintaining other characteristics of the saddle.

The present invention allows for the radius and/or height of the guitar saddle to be shaped and adjusted accurately.

SUMMARY

Certain embodiments of the present invention are directed to a device for shaping and/or adjusting the shape and/or height of a guitar saddle. The present invention allows for the radius and/or height of the guitar saddle to be shaped and adjusted accurately using dial indicators coupled to mechanical positioning apparatus that provide for positioning of a saddle or saddle material for removal of a prescribed amount of material from the top of the guitar saddle while maintaining the radius. In certain aspects the prescribed amount is defined by the settings of horizontal threaded rods positioning the saddle or saddle material and the shape of saddle template that is coupled to the apparatus. The “top” of the guitar saddle is side of the saddle having the radius or arc, which is typically pointing “up” to contact the strings. The substantially flat side of the saddle is the “bottom” of the saddle and contacts the guitar body.

Certain embodiments are directed to a guitar saddle shaping device comprising: a platform having a top surface, a bottom surface, a proximal end, a distal end, and two sides; a saddle holder positioned on the top surface of the platform, the saddle holder having a top portion and a base portion configured to receive and hold a saddle material in position during use; a saddle template that is configured to contact a stop and guide the device during use by providing a sweep determined by the shape of the saddle template; at least a first and second threaded rod, the rods being configured to move individually in a horizontal direction and position the saddle material; at least one rod holding assembly configured to support the threaded rods and allow for horizontal movement of the rods; and at least two measuring devices coupled to the rods for monitoring positioning of the rods; wherein, the device holds a saddle material in the saddle holder and controls the shape of the guitar saddle by adjusting the horizontal position of the threaded rods. In certain aspects the platform can be 6 to 10 inches long, and 8 inches in particular aspects; 2 to 6 inches wide, and 3 to 4 inches in particular aspects, and 1 to 3 inches thick, and 1.5 to 2 inches in particular aspects. In a further aspect the assembled apparatus can be 3 to 6 inches in height. The proximal end of the platform can have an offset with respect to the top surface and the bottom surface. In certain aspects the saddle template is removeably attached to the platform or top surface of the offset. In other aspects the proximal edge of the bottom surface or platform forms the saddle template or saddle template radius. In other aspects the saddle template is removeably attached to the platform. The saddle template can have a curved proximal edge that contacts a guide and controls the shape of the proximal edge of the saddle material during use of the device. In certain aspects the threaded rods are connected to a thumb screw mechanism configured to adjust the horizontal position of the rod(s). The measuring device can be a dial or demarcations on the rods. In certain aspects the top portion of the saddle holder has a broad leading edge that is configured to contact at least 25 to 50% of the width of the saddle material.

Other embodiments are directed to a saddle shaping system comprising a shaping tool and a device as described above. The shaping tool can include an abrasive surface or cutting blade. In certain aspects the shaping tool is a router or a sander. In a further aspect the sander is a disc or belt sander.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to all aspects of the invention. It is contemplated that any embodiment discussed herein can be implemented with respect to any method or composition of the invention, and vice versa. Furthermore, compositions and kits of the invention can be used to achieve methods of the invention.

The use of the word “a” or “an” when used in conjunction with the term “comprising” in the claims and/or the specification may mean “one,” but it is also consistent with the meaning of “one or more,” “at least one,” and “one or more than one.”

Throughout this application, the term “about” is used to indicate that a value includes the standard deviation of error for the device or method being employed to determine the value.

The use of the term “or” in the claims is used to mean “and/or” unless explicitly indicated to refer to alternatives only or the alternatives are mutually exclusive, although the disclosure supports a definition that refers to only alternatives and “and/or.”

As used in this specification and claim(s), the words “comprising” (and any form of comprising, such as “comprise” and “comprises”), “having” (and any form of having, such as “have” and “has”), “including” (and any form of including, such as “includes” and “include”) or “containing” (and any form of containing, such as “contains” and “contain”) are inclusive or open-ended and do not exclude additional, unrecited elements or method steps.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DESCRIPTION OF THE DRAWINGS

The following drawings form part of the present specification and are included to further demonstrate certain aspects of the present invention. The invention may be better understood by reference to one or more of these drawings in combination with the detailed description of the specification embodiments presented herein.

DESCRIPTION

All illustrations of the drawings are for the purpose of describing selected versions of the present invention and are not intended to limit the scope of the present invention.

Figure 1:
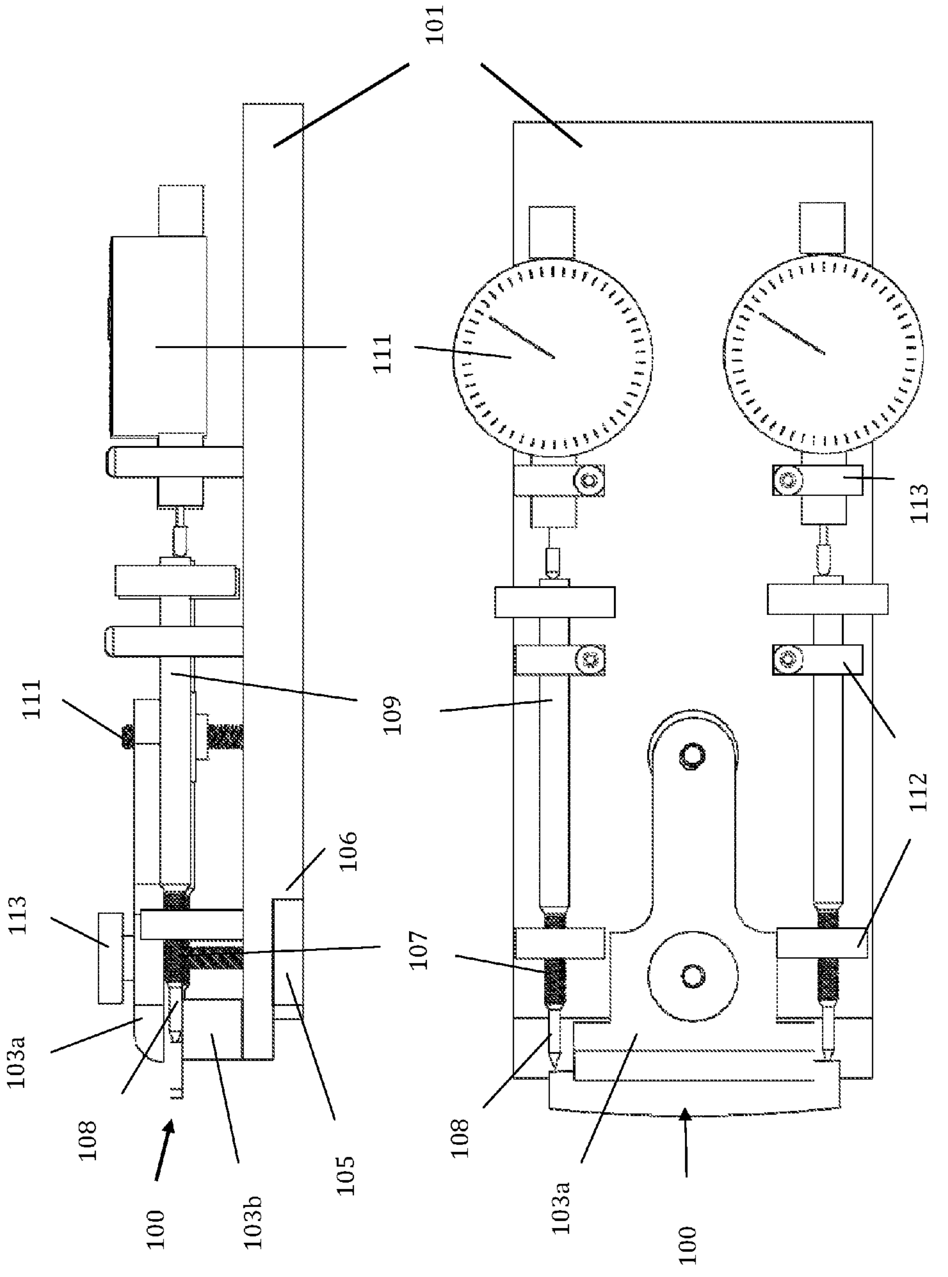
FIG. 1 illustrates a side and top view of the device.

In reference to FIG. 1, the present invention is a tool or device for shaping a guitar saddle (100), such as an acoustic guitar saddle. In certain aspects of the present invention a device comprises a platform (101) having a width, length, and thickness; a saddle holder (103 (103*a*+103*b*)), a saddle template (105), at least a first and second threaded rod (107), at least one rod holding assembly (109), and at least a first and second measuring devices (111) operatively coupled to the first and second threaded rods, respectively. The rod holding assembly positions the rods horizontally with proximal end 108 positioned towards the saddle holder or saddle receiving end and the distal end position opposite the saddle holder. The position of a rod 107 can be adjusted with the rod position monitored using measuring device 111 coupled thereto. The proximal end of the rod (108) is configured to contact the base of a guitar saddle (100) and be adjusted to so that the guitar saddle base is at a predetermined angle with respect to the plane of the rod. In certain aspects measuring device 111 is a dial or gage that quantitates the horizontal position of the rod. Platform 101 can be a metal or hard plastic plate (e.g., an aluminum plate) whereon the other components may be fabricated, disposed, affixed, and/or assembled. Platform 101 has a proximal and distal end, with the proximal end being defined as the end of the device configured to hold saddle material 100 for forming or modifying a guitar saddle. The proximal end can comprise an offset (106), a portion of the upper surface being longer or protruding over the bottom surface. In certain aspects the offset forms a saddle template slot or recess (106). In certain aspects the saddle template is disposed on the bottom surface of platform 101 or in a platform recess. Saddle holder 103 has a top portion (103*a*) and bottom portion (103*b*) that can be separated and brought back together to clamp and hold saddle material 100. A saddle material or a saddle can be positioned in saddle holder 103 and held in place by closing the top and bottom portion of saddle holder 103. Saddle template 105 can be an arcuate or curved template piece of metal of other hard durable material. Saddle template 105 can have a plurality of holes allowing it to be fastened to the proximal portion of platform 101. In certain aspects saddle template 105 can be metal, such as aluminum, steel, stainless steel and the like. In a further aspect a plurality of saddle templates with various shaped can be attached or removed from the device as needed. In certain aspect the top portion of Saddle holder 103 is a T-shaped plate and bottom portion a saddle holder base. In certain aspects saddle holder base 103*b* has a flat top and can be a rectangular prism. An adjustable screw or other device can be used to open or close the saddle holder as needed.

In reference to FIG. 1, in certain aspects the top portion of saddle holder 103*a* is a T-shaped plate can form a first and second hole thereon. The broad side or proximal end of the T-shaped plate may be filleted or rounded to create a curved edge. The bottom portion of the saddle holder 103*b* can also be filleted or rounded along the edge. The saddle holder base can be secured to the platform, for example, using screws (113) and threaded holes. In a further aspect the saddle base can be constructed as a raised portion of the platform itself. A slot or recess can be formed in the upper front edge of the saddle base to secure the guitar saddle thereon. The T-shaped plate (103*a*) is positioned on top of the saddle base (103*b*) and can be adjustable secured by screw 113. Screw 113 can be used to apply pressure to clamp the saddle or saddle material 100. The saddle holder 103 can be adjustable allowing saddles or saddle material of various thicknesses to be clamped. The guitar saddle is preferably placed in the saddle holder and is pressed on top by the T-shaped plate, thereby securing the saddle or saddle material to the saddle holder.

In further reference to FIG. 1, the threaded rods 107 comprise cylindrical members having male threads disposed along the length of the rod and particularly on the proximal and/or distal ends. Threads only need to be present on those portions of the rods that interact with the adjust mechanism or the supports that affix the rod to the platform. The proximal end of the rod may be filed to create points or otherwise configured to interact and contact the saddle or saddle material 100. The distal end of the rod may comprise a circular grip bout the circumference of the rod so that the rod can be manually threaded to move position the rod in the appropriate position. In certain aspects the circular grip is a circular member having grooves disposed on the lateral faces providing the user a gripping surface. The threaded rods may be engaged or affixed to the platform via a rod holding assembly. The preferred rod holding assembly comprises at least two rod aligning stands 112 and dial holding stand 113. Each rod aligning stand comprises a member extending vertically out of the platform and having a rod slot disposed in the center. The preferred rod slot is an unthreaded or threaded hole concentrically accepting a threaded rod. Each of the preferred dial holding stands may comprise a rectangular member extending vertically out of the platform and integrally engaged to one of the at least two measuring dials. In certain aspects the threaded rod is disposed in a central lumen of a hollow cylinder or guide 109.

Horizontally propagating holes or lumens may accept a threaded rod. The proximal end of a threaded rod may extend into the slot formed by the saddle holder, whereby the corners or an areas in the last quarter of either side of the guitar saddle may come into contact with the proximal end of the at least two threaded rods. In certain embodiments of the present invention, at least two threaded rods may be in contact with the area of the guitar saddle corresponding to the $1^{st}$ and $6^{th}$ guitar strings (the outside treble and bass strings). This allows the user to control the tilt angle of the guitar saddle in relation to the saddle holder by turning the circular grips and positioning each of the threaded rods in the appropriate horizontal position. The threads disposed on the rods and support(s) through which the rod pass ensure the threaded rods are kept at a stable horizontal position.

In reference to FIG. 1, at least two measuring devices 111, e.g., measuring dials, may each comprise a rod contacting member and an indicator (e.g., dials). In certain aspects individual measuring devices are connected to individual threaded rods. The measuring devices can be calibrated in a manner wherein small displacements of the rod contacting member can be displayed on the indicator. Each of the rod contacting members may be positioned coincident to the distal end of each of the at least two threaded rods, whereby any movement of the at least two threaded rod may also move the corresponding rod contacting member. This allows the user to clearly gauge the displacement amount or horizontal position of the threaded rod(s).

Figure 2:
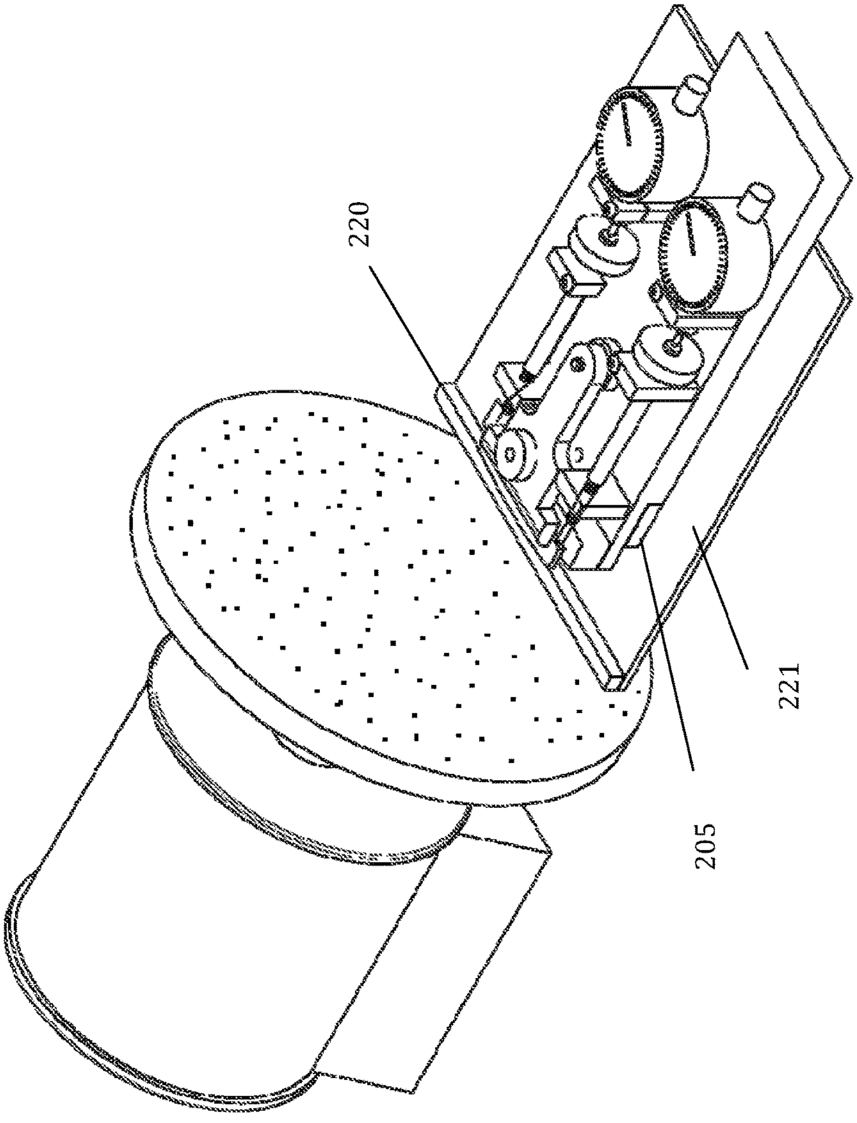
FIG. 2 illustrates one embodiment of the device relative to a shaping tool.

In reference to FIG. 2, saddle template 205 is configured to contact stop 220 or 320 on support 221 or 321 that is associated with a shaping machine. Saddle template 105 or 205 defines a radius for the guitar saddle. The saddle template in conjunction with the stop defines how much of the saddle material will be in contact with a shaping machine, e.g., a sander or router.

Figure 3:
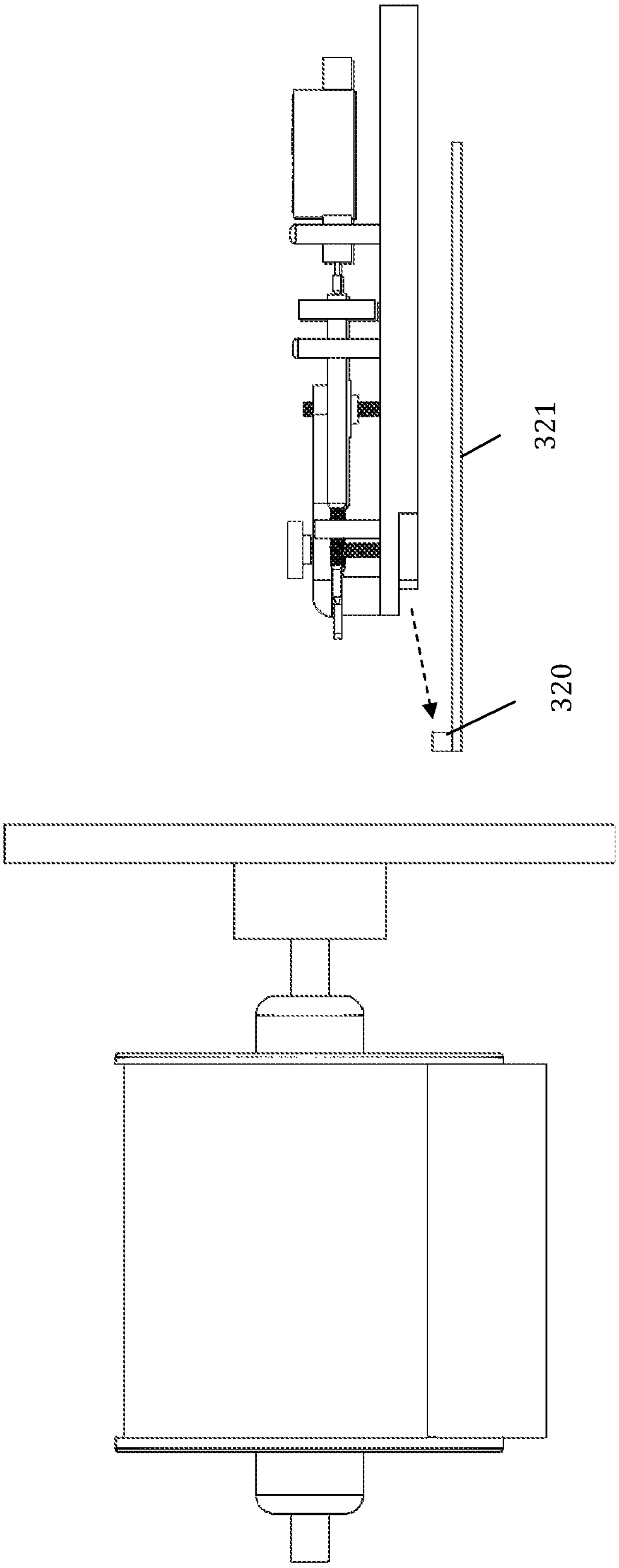
FIG. 3 illustrates a side perspective of one embodiment of the device relative to a shaping tool.
Figure 4:
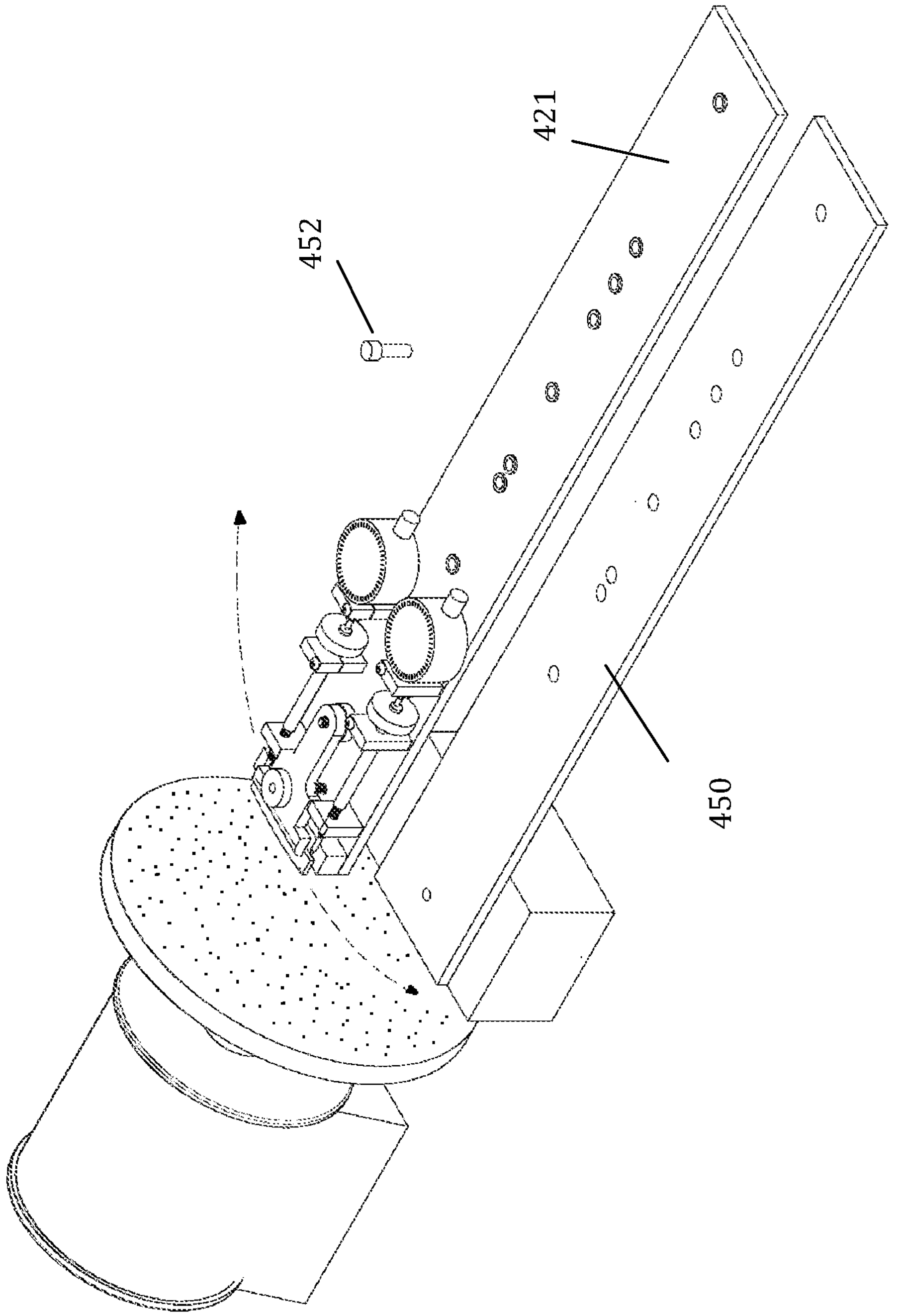
FIG. 4 illustrates one embodiment of the device relative to a shaping tool and a pivot apparatus.

In reference to FIGS. 2-4, in order to use the present invention, the user presents the saddle holder to a shaping tool, such as an abrasive disc, abrasive belt, router blade, or other cutting surface and uses the at least two threaded rods to position the guitar saddle in relation to the saddle holder and the shaping tool (e.g., a disc sander in FIGS. 2-4). The guitar saddle is mounted in the saddle holder and a radius is established by sweeping it over the abrasive surface. The sweep radius is kept constant by rolling the platform on the arcuate face of the saddle template. Different templates may result in different sweep radii.

After shaping the guitar saddle is attached to the guitar and the guitar strung to pitch, noting the amount to be removed on the treble side and bass side. The guitar saddle is then reinstalled in the saddle holder and the threaded rod(s) are advanced by the amount to be removed on to the treble and bass sides of the guitar saddle. The guitar saddle is then presented to the shaping tool a second time to establish the final shape and/or height.

In reference to FIG. 4, certain embodiments of the present invention may omit or specifically exclude the template, and utilize a plurality of holes placed longitudinally on guide platform 421. The user may fasten the guide platform 421 perpendicular to the face of shaping tool via holes located at different longitudinal displacements on the guide platform 421 and a support platform 450. Each hole may accept a bolt (452) allowing rotation in the horizontal direction. In order to change the sweep radius, the user may simply change the hole to the desired radial distance perpendicular to the face of the shaping tool. Minor modifications to the present invention are easily conceivable. For example, the saddle base may comprise separate threaded members arranged concentric to allow the insertion of the at least two threaded rods. In yet another embodiment, T-shaped clamp may mate directly with the platform. Many more modifications and alterations to the preferred embodiment are easily conceivable to those with ordinary skills in the relevant arts.

In regard to the materials utilized for the present invention, embodiments of the present invention can use aluminum and/or brass, as well as other hard durable materials. However, it is easily conceivable that in possible alternate embodiments, each component may be made of a particular material specifically suited to withstand the structural loads and thermal conditions associated with normal and extraneous workloads associated with the alternate embodiments. It is easily conceivable to those having ordinary skills in the relevant arts, that metals, glass, and/or organic biodegradable materials may also be utilized. In such an embodiment, the substantially transparent sections may be composed of a separate clear material.

Although the invention has been explained in relation to its preferred embodiment, it is to be understood that many other possible modifications and variations can be made without departing from the spirit and scope of the invention.

The invention claimed is:

1. A guitar saddle material shaping device comprising:

a platform having a top surface, a bottom surface, a proximal end, a distal end, and two sides;

a saddle holder positioned on the top surface of the platform, the saddle holder having a top portion and a base portion configured to receive and hold a saddle material in position during use;

a saddle template that is configured to contact a stop and guide the device during use by providing a sweep path determined by the shape of an exposed edge of the saddle template;

at least a first and second threaded rod, the threaded rods being configured to move individually in a horizontal direction and position the guitar saddle material; and at least two measuring devices coupled to the threaded rods for monitoring positioning of the threaded rods;

wherein, the device holds the guitar saddle material and controls the shape of a proximal edge of the guitar saddle material when moving the device along the sweep path while the guitar saddle material is in contact with a shaping tool.

2. The device of claim 1, where in the saddle template is integrated into the platform.

3. The device of claim 1, wherein the saddle template is removeably attached to the platform.

4. The device of claim 1, wherein the shape of the exposed edge of the saddle template is curved.

5. The device of claim 1, wherein the threaded rods are connected to a thumb screw mechanism configured to adjust the threaded rod position.

6. The device of claim 1, wherein the measuring device is a dial or demarcations on the threaded rods.

7. The device of claim 1, wherein the top portion of the saddle holder has a broad leading edge that is configured to contact at least 50% of the guitar saddle material along a long axis of the guitar saddle material.

8. The device of claim 1, wherein the proximal edge of the guitar saddle material when positioned in the device extends beyond the proximal end of the platform.

9. A guitar saddle shaping system comprising:

(a) a shaping tool and (b) a device comprising:

(i) a platform having a top surface, a bottom surface, a proximal end, a distal end, and two sides;

(ii) a saddle holder positioned on the top surface of the platform, the saddle holder having a top portion and a base portion configured to receive and hold a guitar saddle material in position during use;

(iii) a saddle template that is configured to contact a stop and guide the device during use by providing a sweep path determined by the shape of a proximal edge of the saddle template;

(iv) at least a first and second threaded rod, the threaded rods being configured to move individually in a horizontal direction and position the saddle material, and at least one threaded rod holding assembly configured to support the threaded rods and allow for horizontal movement of the threaded rods; and (v) at least two measuring devices coupled to the threaded rods for monitoring positioning of the threaded rods, wherein, the device holds the guitar saddle material and controls the shape of a proximal edge of the guitar saddle material when moving the device along the sweep path while the guitar saddle material is in contact with a shaping tool.

10. The system of claim 9, wherein the shaping tool is a router or a sander.

11. The system of claim 10, wherein the sander is a disc or belt sander.

12. A guitar saddle material shaping device comprising:

a guide platform having a top surface, a bottom surface, a proximal end, a distal end, two sides, and a plurality of holes formed longitudinally along the guide platform;

a support platform having a top surface, a bottom surface, a proximal end, a distal end, two sides, and a plurality of holes formed longitudinally along the support platform, wherein at least one hole in the guide platform is selectively aligned and fixed with at least one hole in the support platform to form a rotation point so that the guide platform rotates around the fixed rotation point;

a saddle holder positioned on the top surface of the guide platform, the saddle holder having a top portion and a base portion configured to receive and hold a guitar saddle material in position during use;

at least a first and second threaded rod, the threaded rods being configured to move individually in a horizontal direction and position the guitar saddle material; and at least two measuring devices coupled to the threaded rods for monitoring positioning of the threaded rods;

wherein, the device holds the guitar saddle material and controls the shape of the exposed edge of the guitar saddle material when rotating the guide platform relative to the support platform while the guitar saddle material is in contact with a shaping tool.

* * * * *